(12) United States Patent
Shumard

(10) Patent No.: US 6,786,517 B2
(45) Date of Patent: Sep. 7, 2004

(54) CONCENTRIC PIPE JOINT RESTRAINT

(76) Inventor: Dennis D. Shumard, 311 E. Valley, Eastland, TX (US) 76448

( * ) Notice: Subject to any disclaimer, the term of this patent is extended or adjusted under 35 U.S.C. 154(b) by 0 days.

(21) Appl. No.: 09/993,711

(22) Filed: Nov. 5, 2001

(65) Prior Publication Data
US 2003/0085573 A1 May 8, 2003

(51) Int. Cl.$^7$ ................................................ F16L 19/00
(52) U.S. Cl. ...................... 285/374; 285/375; 285/379; 285/338; 285/339
(58) Field of Search .............................. 285/374, 375, 285/338, 339, 216, 217, 379

(56) References Cited

U.S. PATENT DOCUMENTS

| | | |
|---|---|---|
| 3,627,357 A | 12/1971 | Sanders |
| 4,336,959 A | 6/1982 | Roche |
| 4,417,754 A | 11/1983 | Yamaji et al. |
| 4,466,640 A | 8/1984 | Van Houtte |
| 4,552,385 A | 11/1985 | Peting |
| 4,805,932 A | 2/1989 | Imhof et al. |
| 4,878,697 A | 11/1989 | Henry |
| 4,878,698 A | 11/1989 | Gilchrist |
| 5,037,144 A | 8/1991 | Peting et al. |
| 5,067,751 A | 11/1991 | Walworth et al. |
| 5,197,768 A | 3/1993 | Conner |
| 5,269,569 A | 12/1993 | Weber et al. |
| 5,335,946 A | 8/1994 | Dent et al. |
| 5,476,290 A | 12/1995 | Bergmann et al. |
| 5,662,360 A | 9/1997 | Guzowski |
| 5,803,513 A | 9/1998 | Richardson |
| 5,947,527 A | 9/1999 | Carter |
| 5,951,058 A | 9/1999 | Dickinson et al. |
| 5,988,695 A | 11/1999 | Corbett, Jr. |
| 6,019,396 A | 2/2000 | Saito et al. |
| 6,086,297 A | 7/2000 | Lotfi |

FOREIGN PATENT DOCUMENTS

EP        587131        * 3/1994

* cited by examiner

Primary Examiner—David Bagnell
Assistant Examiner—Giovanna M Collins
(74) Attorney, Agent, or Firm—Schultz & Associates, P.C.

(57) ABSTRACT

A novel concentric pipe joint restraint is disclosed. The restraint is specifically designed to resist axial movement of an inner spigot pipe relative to an outer socket pipe with which it has been joined. The restraint, which operates within the annulus, generally comprises a spigot wedge ring, a socket wedge ring, and one or more specially designed wedge housings. The spigot wedge ring features one or more spigot gripping protrusions which, upon contact, frictionally engage the spigot pipe. The socket wedge ring similarly features one or more socket gripping protrusions which, upon contact, frictionally engage the socket pipe. The wedge housings position the spigot wedge ring and/or the socket wedge ring so that the gripping protrusions grip the pipes, preventing axial movement (whether separation or compression). The wedge rings generally feature at least one frusto-conical surface which engages an opposed frusto-conical surface on either another wedge ring or a housing resulting in a more effective engagement of the gripping protrusions upon the pipe walls.

8 Claims, 7 Drawing Sheets

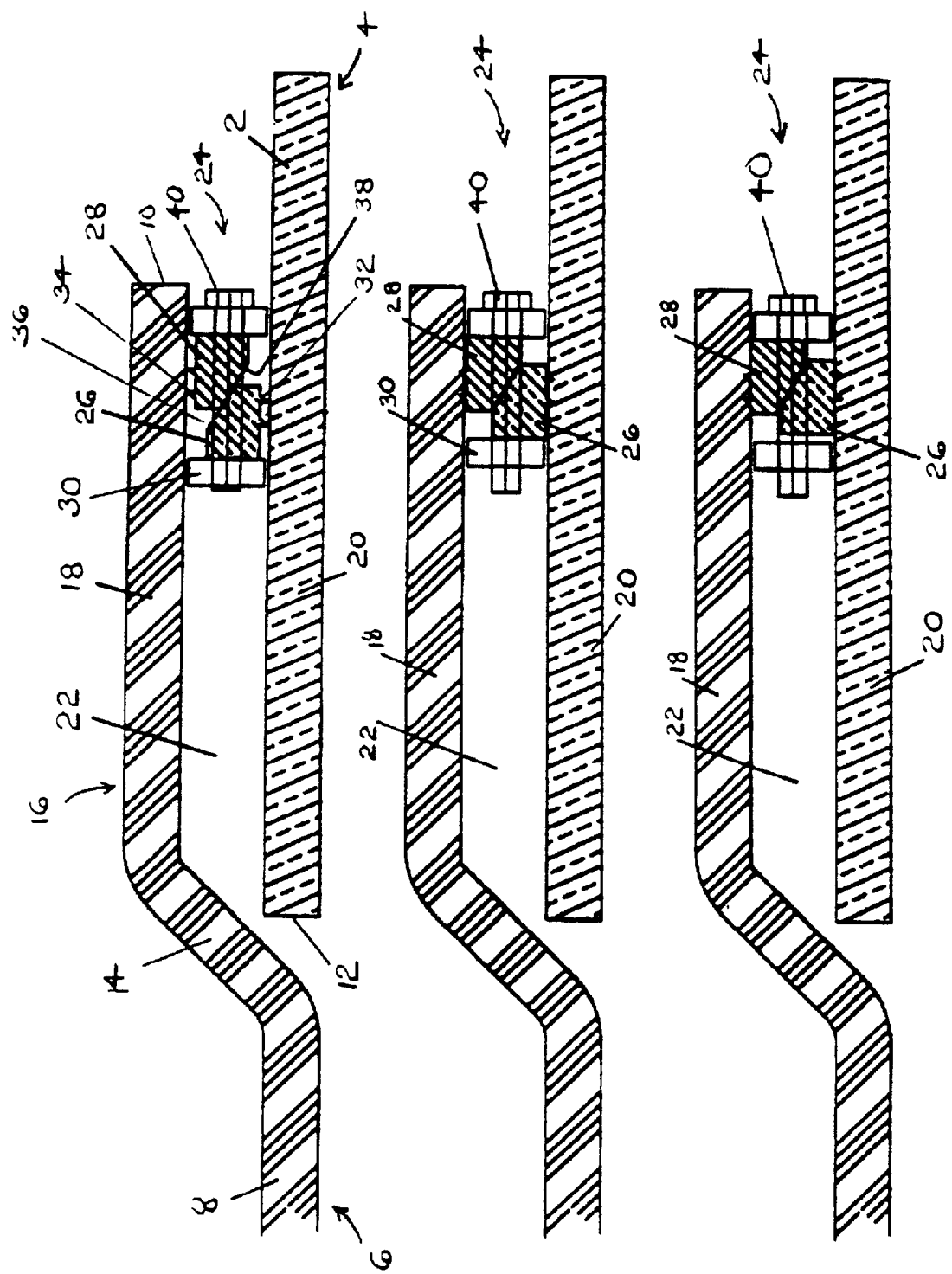

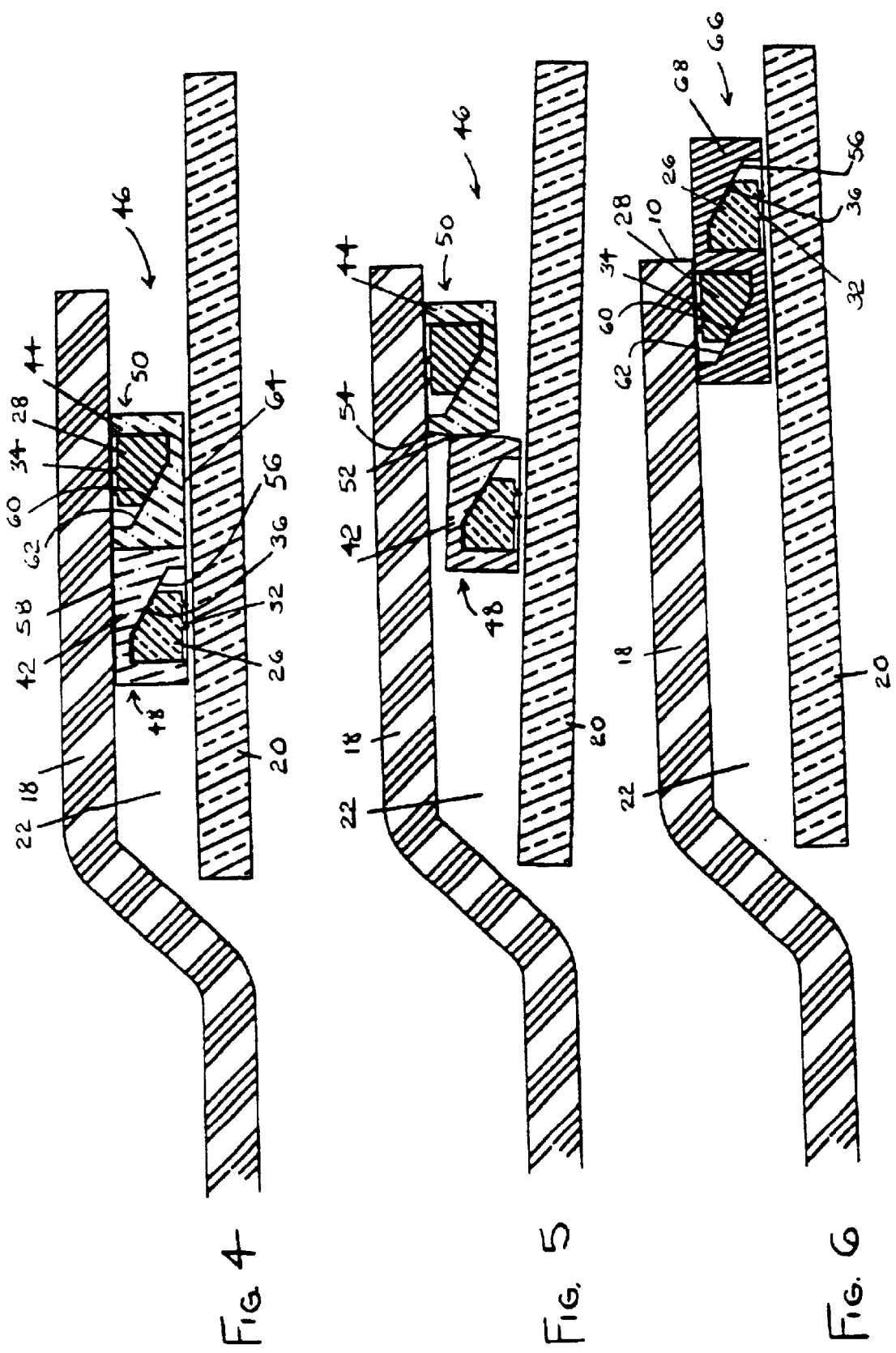

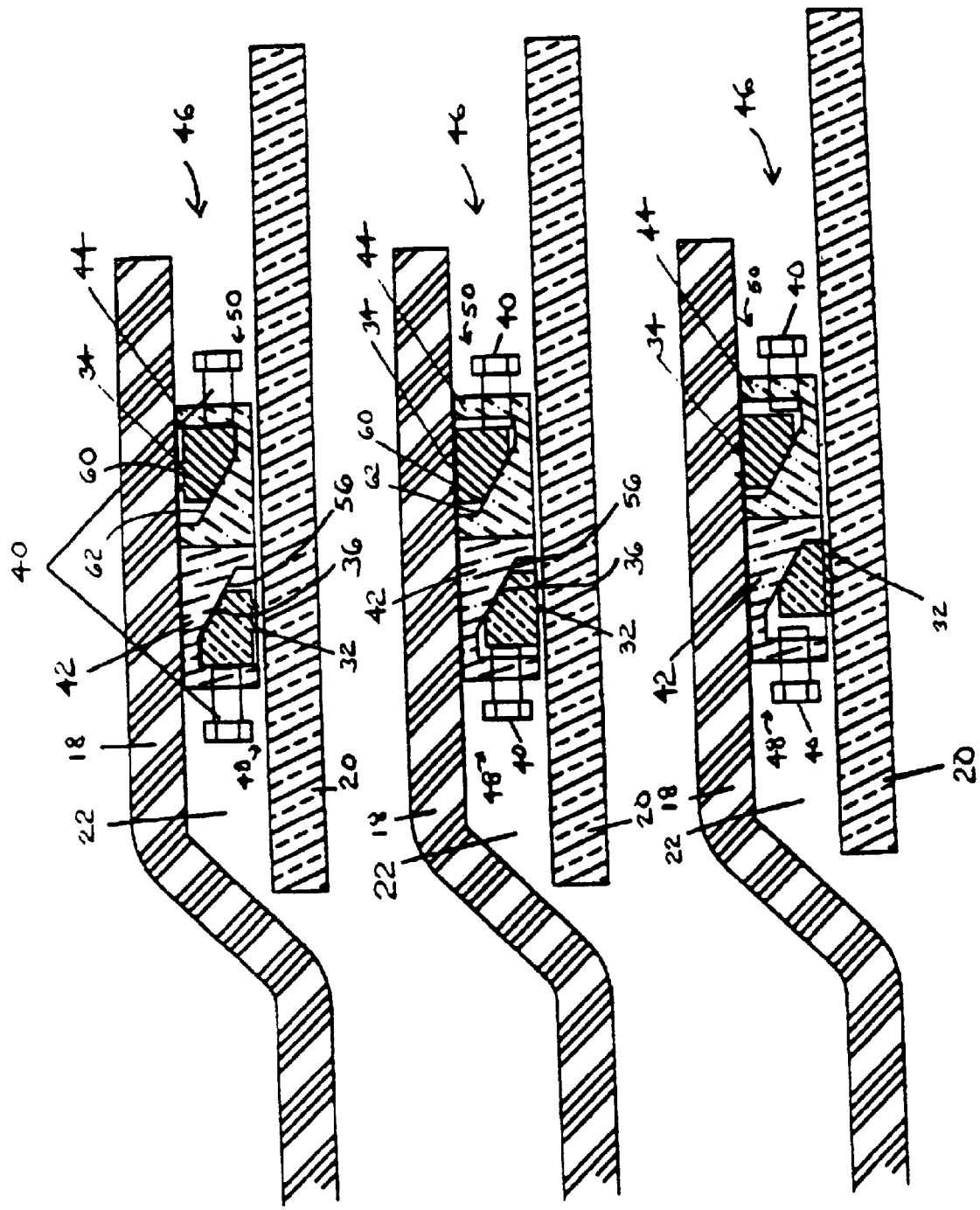

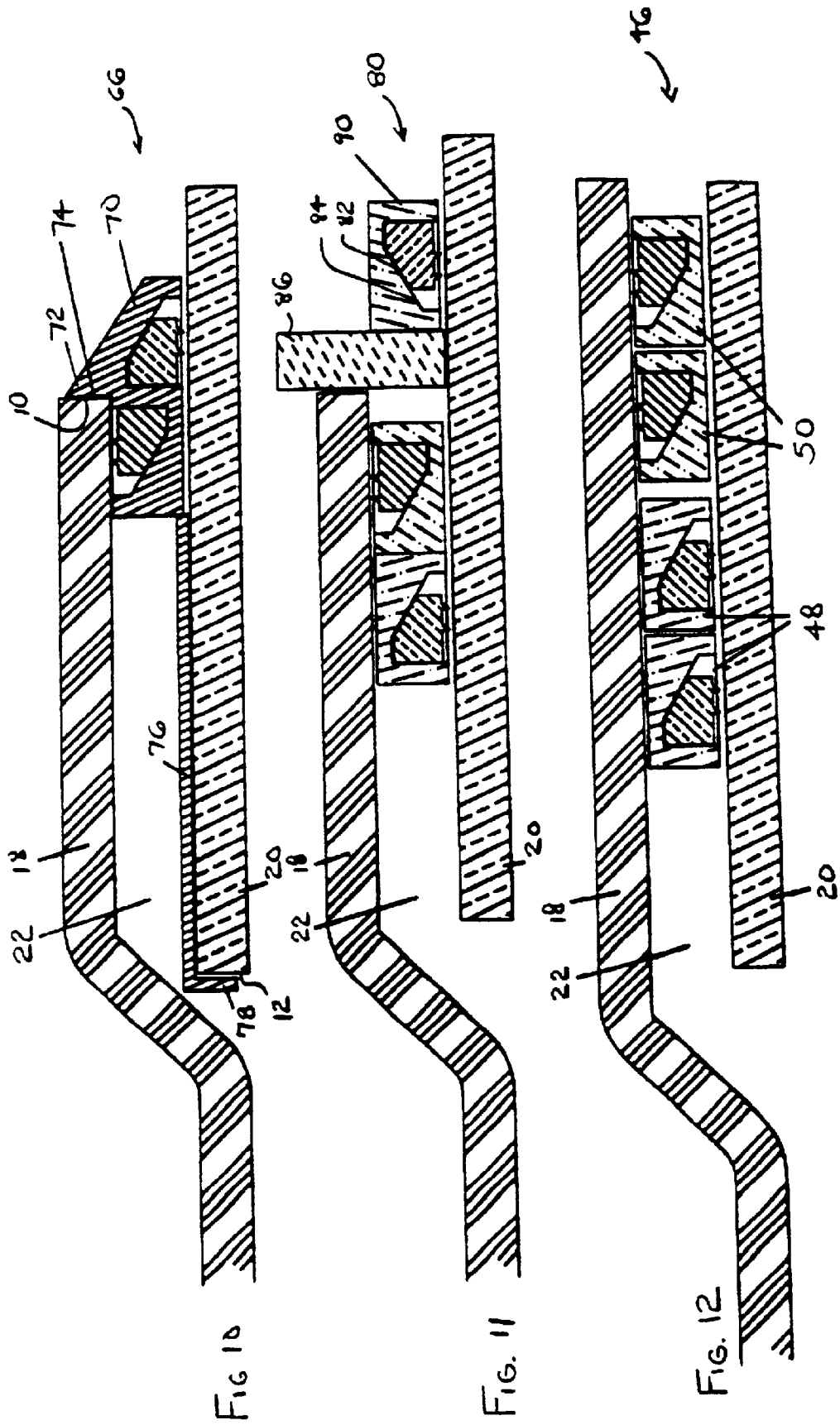

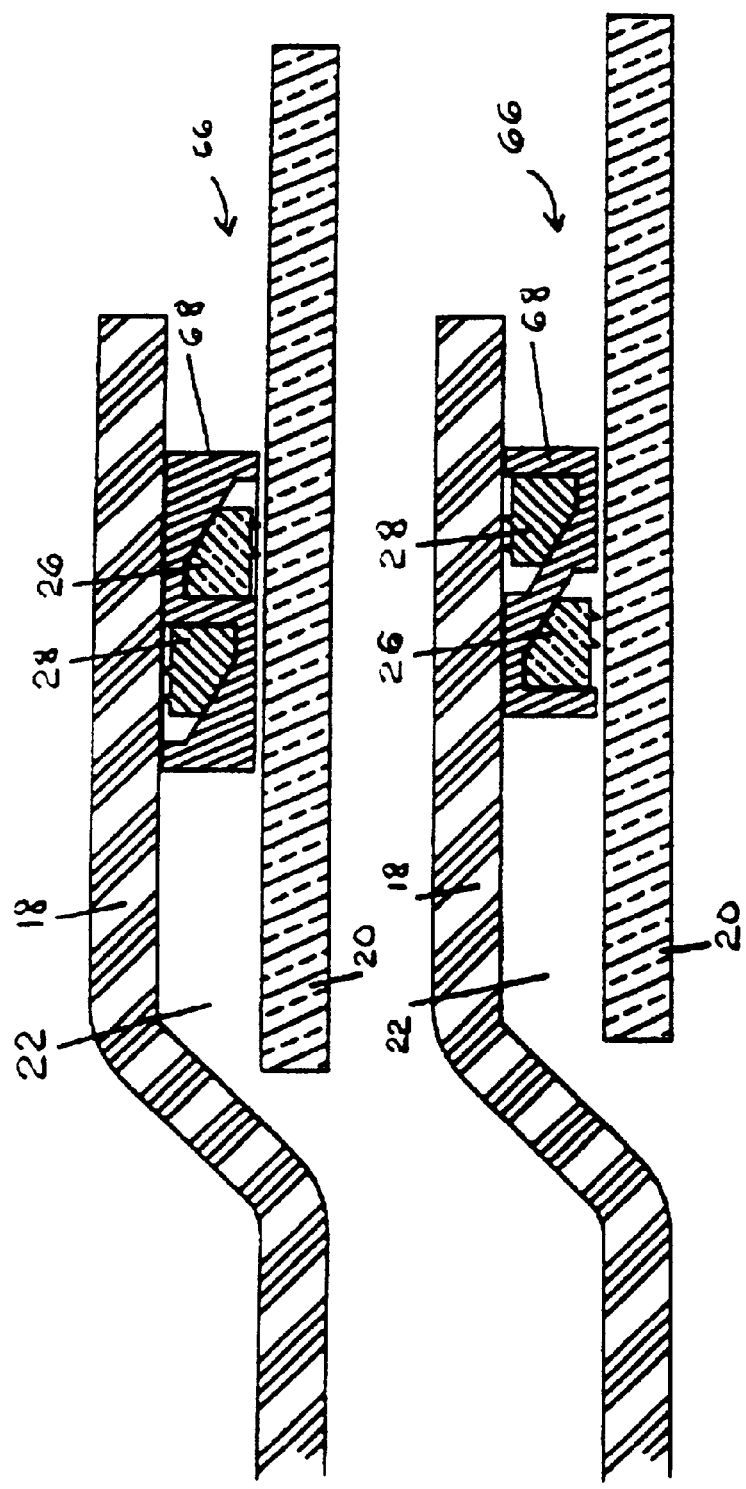

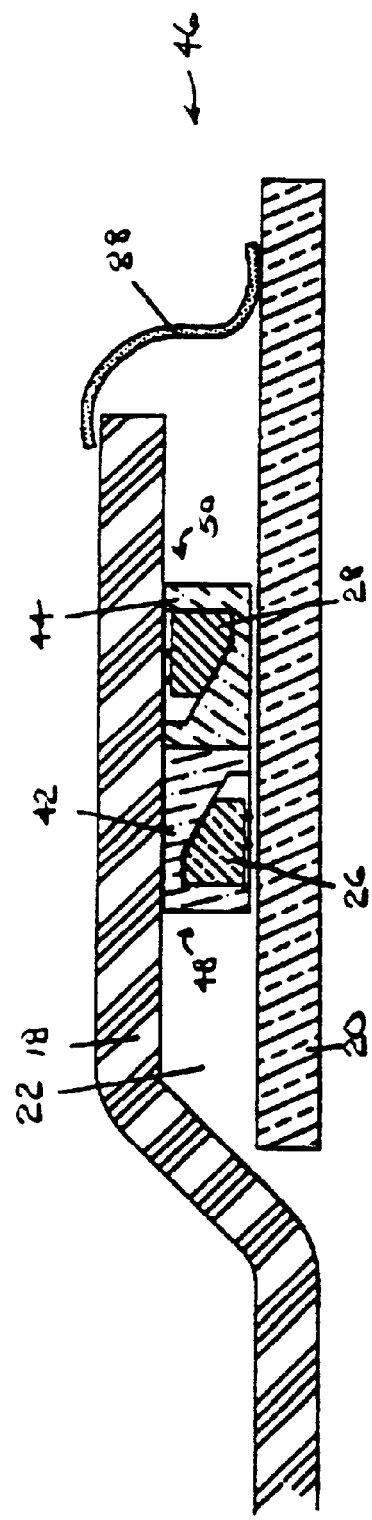

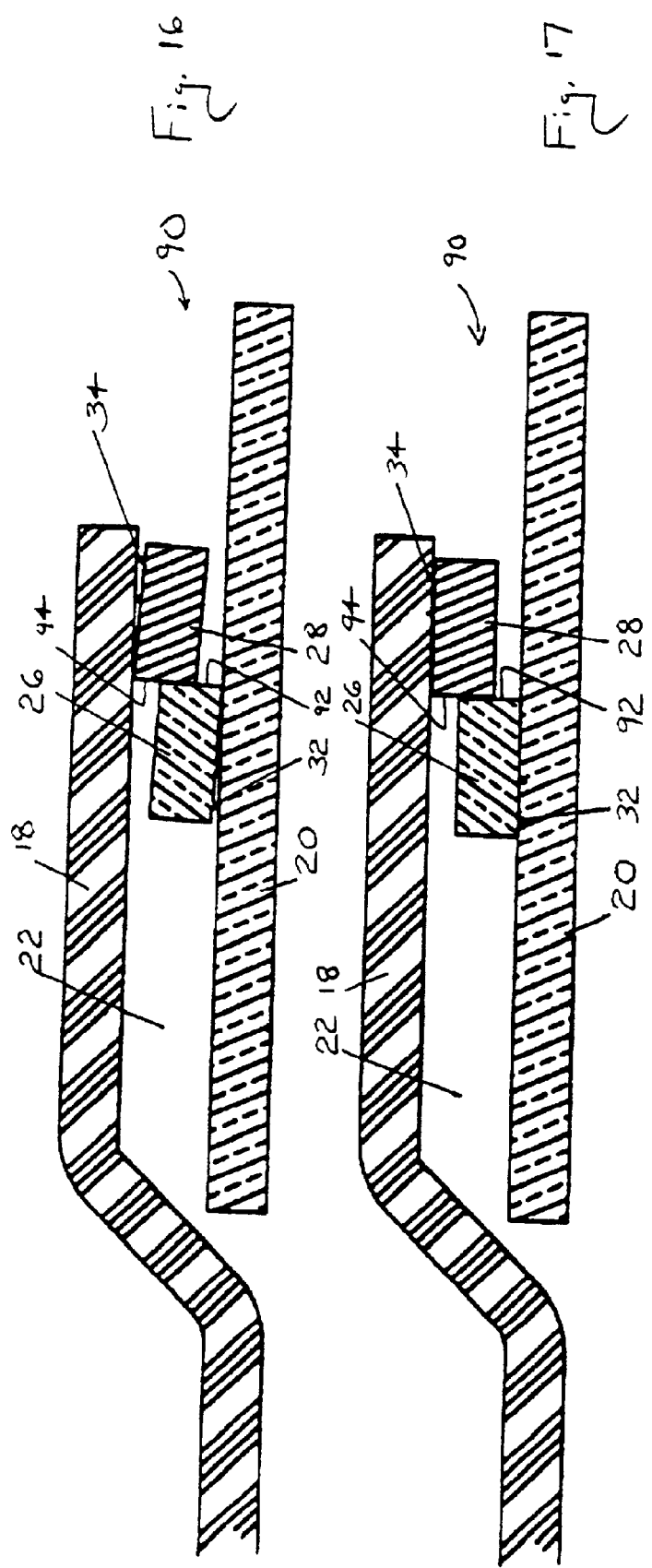

US 6,786,517 B2

CONCENTRIC PIPE JOINT RESTRAINT

FIELD OF THE INVENTION

The field of the invention is concentric pipe joints. Specifically, the invention relates to an annular restraint that minimizes axial movement (separation or compression) of two pipes concentrically joined.

BACKGROUND OF THE INVENTION

The axially aligned joinder of two pipes is commonly effected by arranging for an enlargement in the diameter of one pipe near its terminal end, so that the other pipe can be partially inserted within it. Once the pipes are joined, it is frequently desired that there be minimal axial movement of one pipe relative to another so as to ensure the integrity of the link.

Securing concentric pipe joints for large waterworks-related piping has proven itself to be a daunting task. On occasion, concrete thrust blocks have been poured in and around changes in piping direction to transfer thrust forces to the surrounding soil. Although the method has been used for years, it is often impractical because of pipe congestion, soil conditions, cost considerations, effects upon future excavations, or time constraints.

Restraint devices have been developed and installed external to the concentric pipe joint. Some of these devices feature an external restraint ring connected to each pipe near the joint, the restraint rings themselves being subsequently interconnected to secure the joint. These mechanisms are field adaptable; however, as pipe diameters increase, the designs become heavy and cumbersome. Furthermore, the restraint components are directly exposed to the elements, which, over time, erodes their performance.

Finally, some restraints have been literally designed into the pipes themselves. These restraints frequently feature complex geometries that must be molded into the terminal end portions of the pipes to facilitate joinder. These designs do feature reduced weight; however, the terminal end portions are frequently either difficult to make, complicated to install/disassemble, or cost ineffective. Obviously, field adaptations and modifications to these restraints are difficult as well. Some systems incorporate the restraint into the design of the sealing gasket; however, these systems aren't generally available for pipes in large sizes, and some designs make it almost impossible to disassemble this type of joint.

BRIEF SUMMARY OF THE INVENTION

This patent describes and claims several preferred embodiments of a novel pipe joint restraint. The restraint is specifically designed to resist axial movement of an inner spigot pipe relative to an outer socket pipe with which it has been joined. The restraint conveniently operates in the annular region between the two pipes (defined more precisely hereinbelow).

The restraint generally comprises a spigot wedge ring, a socket wedge ring, and one or more specially designed wedge housings. The spigot wedge ring comprises one or more spigot gripping protrusions which, upon contact, frictionally engage the spigot pipe. The socket wedge ring similarly comprises one or more socket gripping protrusions which, upon contact, frictionally engage the socket pipe. The wedge housings position the spigot wedge ring and/or the socket wedge ring so that the gripping protrusions grip the pipes, preventing axial movement (whether separation or compression).

Highly effective wedge ring designs are disclosed. The wedge rings described generally feature at least one frusto-conical surface which engages an opposed frusto-conical surface on either another wedge ring or a housing resulting in a more effective engagement of the gripping protrusions upon the pipe walls. In fact, in many of the embodiments disclosed herein, the greater the force inciting the undesired axial movement of the pipes, the greater the force that will be applied by the gripping protrusions to the pipe walls to halt the movement.

BRIEF DESCRIPTION OF THE SEVERAL VIEWS OF THE DRAWINGS

FIG. 1 is a side sectional view of a first embodiment of the novel concentric pipe joint restraint claimed herein.

FIG. 2 is a side sectional view depicting the use of an actuator to drive gripping protrusions into pipe walls upon installation.

FIG. 3 is a side sectional view depicting the completed use of an actuator resulting in the seating of the gripping protrusions into the pipe walls upon installation.

FIG. 4 is a side sectional view of a second embodiment of the novel concentric pipe joint restraint claimed herein.

FIG. 5 is a side sectional view of the second embodiment highlighting the use of curved axial end portions to facilitate non-axial movement of the wedge ring modules past one another.

FIG. 6 is a side sectional view of a third embodiment of the novel concentric pipe joint restraint claimed herein.

FIG. 7 is a side sectional view of the second embodiment highlighting the position of actuators prior to engagement.

FIG. 8 is a side sectional view of the second embodiment highlighting the use of actuators to drive gripping protrusions into pipe walls upon installation.

FIG. 9 is a side sectional view of the second embodiment highlighting the completed use of actuators resulting in the seating of the gripping protrusions into the pipe walls upon installation.

FIG. 10 is a side sectional view of the third embodiment featuring the use of socket stops and spigot stops.

FIG. 11 is a side sectional view of the second embodiment featuring the use of a socket stop.

FIG. 12 is a side sectional view of the second embodiment illustrating the simultaneous use of multiple restraints.

FIG. 13 is a side sectional view of the third embodiment highlighting one wedge housing arrangement.

FIG. 14 is a side sectional view of the third embodiment highlighting an alternative wedge housing arrangement.

FIG. 15 is a side sectional view of the second embodiment highlighting the use of a rubber boot to protect the invention from the elements.

FIG. 16 is a side sectional view of a fourth embodiment of the invention. The figure features partially engaged wedge rings and highlights the use of radial surfaces to regulate movement.

FIG. 17 is a side sectional view of the fourth embodiment of the invention. The figure features fully engaged wedge rings and highlights the use of radial surfaces to regulate movement.

DETAILED DESCRIPTION OF THE INVENTION

Referring now to FIG. 1, a single side wall 2 of a first pipe indicated generally at 4 is shown. The first pipe 4 is depicted as being joined to a second pipe 6. The axially aligned joinder of these two pipes is possible because, near the terminal end 10 of the second pipe 6, for a set distance, the diameter of the second pipe 6 is enlarged, forming a socket or bell (depicted generally at 16), which facilitates a partial insertion of said first pipe 4 within said second pipe 6.

The region of joinder merits scrutiny. The second pipe 6 enlarges its diameter by means of a frusto-conical section 14, so that an enlarged diameter creates a region of joinder spanning from the frusto-conical section 14 to the terminal end 10 of the second pipe 6. Note that, in this region, the inside diameter of the second pipe 6 (termed the "bell pipe" 18 or "socket pipe" 18 in this region) is greater than the outside diameter of the first pipe 4 (termed the "spigot pipe" 20 in this region). The generally cylindrical volumetric region between the socket pipe 18 and the spigot pipe 20 defines an annular region or annulus 22, and it exists whether the cylindrical pipe sections to be joined are portions of pipes of different diameters, portions of pipes of similar diameters (joined by means of the spigot-and-bell arrangement described above), or portions of cylindrical fittings.

A pipe joint restraint, indicated generally at 24, is disclosed. The restraint 24 is specifically designed to resist axial movement of the spigot pipe 20 relative to a socket pipe 18. As indicated, the restraint 24 comprises a spigot wedge ring 26, a socket wedge ring 28, and a wedge housing 30. The spigot wedge ring 26 comprises one or more spigot gripping protrusions 32 which, upon contact, frictionally engage the spigot pipe 20. The socket wedge ring 28 similarly comprises one or more socket gripping protrusions 34 which, upon contact, frictionally engage the socket pipe 18. The gripping protrusions may feature unitary, pointed protrusions, or they may feature a lower relative roughness approaching that of sandpaper. The wedge housing 30 positions the spigot wedge ring 26 and the socket wedge ring 28 into direct contact both with one another and with their respective pipe walls, so that, upon placement, the spigot gripping protrusions 32 grip the spigot pipe 20 and the socket gripping protrusions 34 grip the socket pipe 18.

As shown, a highly effective spigot wedge ring 26 further comprises a frusto-conical surface 36, and, preferably, the socket wedge ring 28 further comprises an opposed frusto-conical surface 38 in direct and effective contact with the frusto-conical surface 36. The reason the frusto-conical surfaces 36, 38 contribute to the effectiveness of the restraint 24 becomes clear upon consideration of the movement of the wedge rings, and their respective gripping protrusions, upon axial movement of the pipes.

Although the restraint 24 shown in FIG. 1 resists axial movement of the pipes 18, 20 vis-a-vis one another in either direction (i.e., axial movement that separates or compresses the two pipes), the restraint 24 features frusto-conical surfaces 36, 38 that are biased (i.e., positioned) in such a way as to peculiarly or specially resist axial separation. If, viewing FIG. 1, spigot pipe 20 is drawn or otherwise urged to the right, or socket pipe 18 is drawn or otherwise urged to the left, effecting an axial separation between the two pipes, the spigot gripping protrusions 32 and socket gripping protrusions 34 will provide an initial functional resistance. If the axial separation continues, the spigot wedge ring 26 will be axially driven into socket wedge ring 28. As this occurs, its frusto-conical surface 36 will engage the opposing frusto-conical surface 38, with the result being that both the spigot gripping protrusions 32 and the socket gripping protrusions 34 will be urged with greater normal (i.e., generally perpendicular) force into the walls of the spigot pipe 20 and socket pipe 18 respectively. This driving of the gripping protrusions 32, 34 into the walls 20, 18 increases the resistive force the restraint 24 will exert against separation.

From inspection of FIGS. 2 and 3, it will be appreciated that the initial resistance imparted by the restraint 24 can be accentuated by means of an actuator 40 which drives the gripping protrusions 32, 34 into the pipes 20, 18 upon installation. As shown in FIG. 2, the actuator 40 (here, by way of example, a bolt/nut combination connected via axially aligned holes in the wedge rings and wedge housing) imparts axial movement of the wedge rings 26, 28 relative to one another, the axial movement imparting the sliding axio-radial movement of the frusto-conical surfaces 36, 38 described above. The radial component of this movement drives the gripping protrusions 32, 34 deeper into the pipes 20, 18, as shown in FIG. 2, and it continues until the gripping protrusions 32, 34 are fully seated as shown in FIG. 3.

It will be appreciated that the orientation of the frusto-conical surfaces 36, 38 can be inverted, yielding a restraint 24 that resists axial compression, rather than separation as shown in FIGS. 1–3. It will also be appreciated that numerous designs of gripping protrusions 32, 34 can be employed. The gripping protrusions can be oriented so that their longitudinal axis is perpendicular to the pipe wall with which they are in contact, so that axial separation and compression are equally resisted. Alternatively, the gripping protrusions can be biased so that their longitudinal axes are not perpendicular to the wall, but, rather, are oriented so as to provide peculiar or special resistance to either axial separation or compression.

Both the spigot wedge "ring" 26 and the socket wedge "ring" 28 (as well as many of the other ring-shaped structures described in this application) will commonly be constructed as closed-loop rings of a diameter appropriate to the application at hand. However, both rings can be broken at a single point or multiple points yielding rings featuring circumferential end portions. Breaking a wedge ring at a single point facilitates radial contraction and expansion; breaking a wedge ring at several points enables selective placement of the wedge ring segments about the circumference of the pipes.

Reference to FIGS. 4–5 reveals an alternative embodiment of the invention. The joint restraint depicted, designated generally at 46, comprises a spigot wedge ring module, designated generally at 48, and a socket wedge ring module, designated generally at 50. The spigot wedge ring module 48 comprises a spigot wedge ring housing 42 which positions a spigot wedge ring 26 so that its spigot gripping protrusions 32 are in gripping contact with the wall of the spigot pipe 20. The socket wedge ring module 50 comprises a socket wedge ring housing 44 which positions a socket wedge ring 28 so that its socket gripping protrusions 34 are in gripping contact with the wall of the socket pipe 18.

As shown in FIG. 5, a refinement to the wedge ring modules lies in the shape of the axial end portion of the wedge ring housings. If it is anticipated that the spigot wedge ring module 48 and socket wedge ring module 50 will be in such close proximity that they will actually be in direct contact, and if it is further anticipated that substantial non-axial (e.g., radial) movement of the spigot pipe 20 and the socket pipe 18 relative to one another will occur, then the wedge ring modules 48, 50 of FIG. 5 will move more easily past one another than those of FIG. 4 if at least one wedge ring module comprises a wedge ring housing comprising a curved axial end portion. In FIG. 5, for example, both wedge ring housings are shown with curved axial end portions. Spigot wedge ring housing 42 is shown with a curved axial end portion 52, and socket wedge ring housing 44 is shown with curved axial end portion 54.

Returning now to FIG. 4, it will be observed that the spigot wedge ring 26 comprises a frusto-conical surface 36 which is in direct and effective contact with an opposed frusto-conical surface 56 in the spigot wedge ring housing 42. Although the spigot wedge ring module 48 shown in FIG. 4 resists axial movement of the pipes 18, 20 vis-a-vis one another in either direction, the module 48 features frusto-conical surfaces 36, 56 that are biased (i.e., positioned) in such a way as to peculiarly or specially resist axial separation. If, viewing FIG. 4, spigot pipe 20 is drawn or otherwise urged to the right, or socket pipe 18 is drawn or otherwise urged to the left, effecting an axial separation between the two pipes, the spigot gripping protrusions 32 will provide an initial functional resistance. If the axial separation continues, the frusto-conical surface 36 will engage the opposing frusto-conical surface 56, with the result being that the spigot gripping protrusions 32 will be urged with greater normal force into the walls of the spigot pipe 20. This driving of the spigot gripping protrusions 32 into the spigot pipe 20, coupled with the substantial frictional effect associated with the surface-to-surface contact between the radially outer surface 58 of the spigot wedge ring housing 42 and the inner surface of the socket pipe 18, increases the resistive force the spigot wedge ring module 48 will exert against separation.

From inspection of FIGS. 7–9, it will be appreciated that the initial resistance imparted by the spigot wedge ring module 48 can be accentuated by means of an actuator 40 which drives the gripping protrusions 32 into the spigot pipe 20 upon installation. As shown in FIG. 7, the actuator 40 (here, by way of example, a bolt threading an axially aligned hole in the spigot wedge ring housing) imparts axial movement of the spigot wedge ring 26, the axial movement imparting the sliding axio-radial movement of the frusto-conical surfaces 36, 56 described above. The radial component of this movement drives the gripping protrusions 32 deeper into the spigot pipe 20, as shown in FIG. 8, and it continues until the gripping protrusions 32 are fully seated as shown in FIG. 9.

It will be appreciated that the orientation of the frusto-conical surfaces 36, 56 can be inverted, yielding a spigot wedge ring module 48 that resists axial compression, rather than separation as shown in FIGS. 7–9. It will also be appreciated that numerous designs of gripping protrusions 32 can be employed. The gripping protrusions can be oriented so that their longitudinal axis is perpendicular to the pipe wall with which they are in contact, so that axial separation and compression are equally resisted. Alternatively, the gripping protrusions can be biased so that their longitudinal axes are not perpendicular to the wall, but, rather, are oriented so as to provide peculiar or special resistance to either axial separation or compression.

Returning now to FIG. 4, it will be observed that the socket wedge ring 28 comprises a frusto-conical surface 60 which is in direct and effective contact with an opposed frusto-conical surface 62 in the socket wedge ring housing 44. Although the socket wedge ring module 50 shown in FIG. 4 resists axial movement of the pipes 18, 20 vis-a-vis one another in either direction, the module 50 features frusto-conical surfaces 60, 62 that are biased (i.e., positioned) in such a way as to peculiarly or specially resist axial separation. If, viewing FIG. 4, spigot pipe 20 is drawn or otherwise urged to the right, or socket pipe 18 is drawn or otherwise urged to the left, effecting an axial separation between the two pipes, the socket gripping protrusions 34 will provide an initial frictional resistance. If the axial separation continues, the frusto-conical surface 60 will engage the opposing frusto-conical surface 62, with the result being that the socket gripping protrusions 34 will be urged with greater normal force into the walls of the socket pipe 18. This driving of the socket gripping protrusions 34 into the socket pipe 18, coupled with the substantial frictional effect associated with the surface-to-surface contact between the radially inner surface 64 of the socket wedge ring housing 44 and the outer surface of the spigot pipe 20, increases the resistive force the socket wedge ring module 50 will exert against separation.

From inspection of FIGS. 7–9, it will be appreciated that the initial resistance imparted by the socket wedge ring module 50 can be accentuated by means of an actuator 40 which drives the gripping protrusions 34 into the socket pipe 18 upon installation. As shown in FIG. 7, the actuator 40 (here, by way of example, a bolt threading an axially aligned hole in the socket wedge ring housing) imparts axial movement of the socket wedge ring 28, the axial movement imparting the sliding axio-radial movement of the frusto-conical surfaces 60, 62 described above. The radial component of this movement drives the gripping protrusions 34 deeper into the socket pipe 18, as shown in FIG. 8, and it continues until the gripping protrusions 34 are fully seated as shown in FIG. 9.

It will be appreciated that the orientation of the frusto-conical surfaces 60, 62 can be inverted, yielding a socket wedge ring module 50 that resists axial compression, rather than separation as shown in FIGS. 7–9. It will also be appreciated that numerous designs of gripping protrusions 34 can be employed. The gripping protrusions can be oriented so that their longitudinal axis is perpendicular to the pipe wall with which they are in contact, so that axial separation and compression are equally resisted. Alternatively, the gripping protrusions can be biased so that their longitudinal axes are not perpendicular to the wall, but, rather, are oriented so as to provide peculiar or special resistance to either axial separation or compression.

It will be appreciated that the simultaneous use of multiple restraints 46 will increase the force resisting axial movement of the pipes 20, 18. An example of the simultaneous use of two restraints 46 is depicted in FIG. 12.

Reference to FIG. 6 reveals an alternative embodiment of the invention. The joint restraint depicted, designated generally at 66, comprises a spigot wedge ring 26, a socket wedge ring 28, and a wedge housing 68. The wedge housing 68 positions the spigot wedge ring 26, so that its spigot gripping protrusions 32 are in gripping contact with the wall of the spigot pipe 20. The wedge housing 68 also positions the socket ring 28, so that its socket gripping protrusions 34 are in gripping contact with the wall of the socket pipe 18.

It will be observed that the spigot wedge ring 26 comprises a frusto-conical surface 36 which is in direct and effective contact with an opposed frusto-conical surface 56 in the wedge housing 68. It will also be observed that the socket wedge ring 28 comprises a frusto-conical surface 60 which is in direct and effective contact with an opposed frusto-conical surface 62 in the wedge housing 68.

Although the wedge housing 68 shown in FIG. 6 resists axial movement of the pipes 18, 20 vis-a-vis one another in either direction, the housing 68 features frusto-conical surfaces 36, 56 and 60, 62 that are biased in such a way as to peculiarly or specially resist axial separation. If, viewing FIG. 6, spigot pipe 20 is drawn or otherwise urged to the right, or socket pipe 18 is drawn or otherwise urged to the left, effecting an axial separation between the two pipes, the gripping protrusions 32, 34 will provide an initial functional resistance. If the axial separation continues, the frusto-conical surfaces 36, 60 will engage the opposing frusto-conical surfaces 56, 62 with the result being that the gripping protrusions 32, 34 will be urged with greater normal force into the walls of the pipes 20, 18. This driving of the gripping protrusions 32, 34 into the pipes 20, 18, coupled with the substantial fictional effect associated with the surface-to-surface contact between the radially outer surface 58 of the wedge housing 68 and the inner surface of the socket pipe 18 and between the radially inner surface 64 of the wedge housing 68 and the outer surface of the spigot pipe 20, increases the resistive force the wedge housing 68 will exert against separation. It should be noted that, so long as the wedge housing 68 is made of materials of reasonable rigidity given the application, the restraint 66 is effective even when a substantial portion of the restraint, though nonetheless within the annular region 22, extends beyond the terminal end 10 of the socket pipe 18.

It will be appreciated that the initial resistance imparted by the wedge rings 26, 28 can be accentuated by means of actuators which drive the gripping protrusions 32, 34 into the pipes 20, 18 upon installation. The actuators impart axial movement of the wedge rings 26, 28, the axial movement imparting the sliding axio-radial movement of the frusto-conical surfaces 36, 56 and 60, 62 described above. The radial component of these movements drive the gripping protrusions 32, 34 deeper into the pipes 20, 18, and it continues until the gripping protrusions 32, 34 are fully seated.

It will be appreciated that the orientation of the frusto-conical surfaces 36, 56 and 60, 62 can be inverted, yielding a restraint 66 that peculiarly and specially resists axial compression, rather than separation as shown in FIG. 6. It will also be appreciated that numerous designs of gripping protrusions 32, 34 can be employed. The gripping protrusions can be oriented so that their longitudinal axis is perpendicular to the pipe wall with which they are in contact, so that axial separation and compression are equally resisted. Alternatively, the gripping protrusions can be biased so that their longitudinal axes are not perpendicular to the wall, but, rather, are oriented so as to provide peculiar or special resistance to either axial separation or compression.

Reference to FIG. 10 reveals a wedge housing 70 that is specially modified to prevent inadvertent excessive axial compression (also known as "overbelling") of the pipes 20, 18. The wedge housing 70 is similar in design and operation to wedge housing 68, except that wedge housing 70 further comprises a socket stop 72. The socket stop 72 comprises a radially outwardly extending ledge 74 which engages the terminal end portion 10 of the socket pipe 18. The wedge housing 70 shown in FIG. 10 further comprises a spigot stop 76. The spigot stop 76 comprises a radially inwardly extending ledge 78 which engages the terminal end portion 12 of the spigot pipe 20.

FIG. 11 reveals one example of how the socket stop depicted at 72 in FIG. 10 can be utilized as an integral fixed component of a spigot wedge ring module of the type depicted generally at 48 in FIG. 4. Note that the FIG. 11 spigot wedge ring module 80, with its spigot wedge ring housing 90, frusto-conical surfaces 82, 84, and its socket stop 86, effectively prevents overbelling. Other variations on the use of socket and spigot stops with the wedge ring modules described herein are apparent.

FIG. 13 and FIG. 14 highlight alternative designs for the wedge housing 68 first described with reference to FIG. 6. A cursory glance reveals that the main difference between the two designs, each of which resists axial separation, is the longitudinal (or axial) relative position of the spigot wedge ring 26 vis-a-vis the socket wedge ring 28. The difference has structural implications. If axial separation of pipes 20, 18 in FIG. 13 is urged, the normal forces driving the gripping protrusions home are at their greatest at the axial extremities of the wedge housing. If axial separation of pipes 20, 18 in FIG. 14 is urged, the normal forces driving the gripping protrusions home are at their greatest at the axial center of the wedge housing.

FIG. 15 demonstrates the use of a rubber boot 88, a simple but effective way to provide a measure of protection to the invention from the elements, thus prolonging its useful life.

Reference to FIGS. 16 and 17 reveals a final alternative embodiment of the invention. The concentric pipe constraint 90 comprises a spigot wedge ring 26 comprising one or more spigot gripping protrusions 32 which grip the spigot pipe 20 and a first radial surface 92. The pipe constraint 90 also comprises a socket wedge ring 28 comprising one or more socket gripping protrusions 34 which grip the socket pipe 18 and a second radial surface 94. As reference to FIGS. 16 and 17 reveals, the first and second radial surfaces 92, 94 are in effective contact with one another so as to prevent axial movement of the spigot pipe 20 relative to the socket pipe 18 (in FIGS. 16 and 17, the axial movement prevented is that of axial separation).

Variations on the design of the invention disclosed above will become apparent to persons of ordinary skill in the art. The restraint disclosed can be utilized on many types of piping material. PVC piping of all sizes is a clearly envisioned application; however, the wedge rings could be made of a hardened material such that the device would hold metal pipes (such as those made of iron or steel). It is certainly possible to restrain a broad array of combinations of materials (e.g., ductile pipe in a PVC bell; steel pipe in a ductile iron bell).

The wedge rings and wedge ring housings are commonly made of steel or ductile iron. However, the material could also be corrosion resistant, such as stainless steel. The primary requirement is that the wedge rings be made from stronger and harder materials than the pipes on which they will be assembled and that the housings be strong enough to safely withstand the sheer forces that occur. Reinforced polymers could potentially be used in some non-metallic piping applications.

Although the preferred embodiment of the invention has been disclosed, it is to be understood that the invention is not limited thereto. For a fuller understanding of the scope of the claimed invention, reference should be made to the following claims.

I claim:

1. A concentric pipe joint constraint, said restraint resisting axial movement of a spigot pipe relative to a socket pipe within which a portion of said spigot pipe has been inserted, said spigot pipe and said socket pipe defining an annulus, said restraint comprising:
   a spigot wedge ring comprising one or more spigot gripping protrusions;
   socket wedge ring comprising one or more socket gripping protrusions;
   a wedge housing positioning said spigot wedge ring relative to said socket wedge ring with which it is in effective contact in said annulus such that said spigot gripping protrusions grip said spigot pipe and said socket gripping protrusions grip said socket pipe;

wherein said spigot wedge ring further comprises a frusto-conical surface;

said socket wedge ring further comprises an opposed frusto-conical surface in effective contact with said frusto-conical surface;

the gripping protrusions are biased to prevent axial separation of the pipes;

the frusto-conical surfaces are biased to prevent axial separation of the pipes; and an actuator driving said gripping protrusions into said pipes by imparting axial movement of said wedge rings relative to one another, said axial movement imparting sliding axio-radial movement of said frusto-conical surfaces relative to one another.

2. A concentric pipe joint constraint, said restraint resisting axial movement of a spigot pipe relative to a socket pipe within which a portion of said spigot pipe has been inserted, said spigot pipe and said socket pipe defining an annulus, said restraint comprising:

a spigot wedge ring comprising one or more spigot gripping protrusions;

socket wedge ring comprising one or more socket gripping protrusions;

a wedge housing positioning said spigot wedge ring relative to said socket wedge ring with which it is in effective contact in said annulus such that said spigot gripping protrusions grip said spigot pipe and said socket gripping protrusions grip said socket pipe;

wherein said spigot wedge ring further comprises a frusto-conical surface;

said socket wedge ring further comprises an opposed frusto-conical surface in effective contact with said frusto-conical surface; and wherein the gripping protrusions are biased to prevent axial compression of the pipes.

3. The restraint of claim 2 wherein the frusto-conical surfaces are biased to prevent axial separation of the pipes.

4. A concentric pipe joint constraint, said restraint resisting axial movement of a spigot pipe relative to a socket pipe within which a portion of said spigot pipe has been inserted, said spigot pipe and said socket pipe defining an annulus, said restraint comprising:

a spigot wedge ring comprising one or more spigot gripping protrusions;

socket wedge ring comprising one or more socket gripping protrusions;

a wedge housing positioning said spigot wedge ring relative to said socket wedge ring with which it is in effective contact in said annulus such that said spigot gripping protrusions grip said spigot pipe and said socket gripping protrusions grip said socket pipe;

wherein said spigot wedge ring further comprises a frusto-conical surface;

said socket wedge ring further comprises an opposed frusto-conical surface in effective contact with said frusto-conical surface;

the gripping protrusions are biased to prevent axial compression of the pipes; and wherein the frusto-conical surfaces are biased to prevent axial compression of the pipes.

5. A concentric pipe joint constraint, said restraint resisting axial movement of a spigot pipe relative to a socket pipe within which a portion of said spigot pipe has been inserted, said spigot pipe and said socket pipe defining an annulus, said restraint comprising:

a spigot wedge ring comprising one or more spigot gripping protrusions;

socket wedge ring comprising one or more socket gripping protrusions;

a wedge housing positioning said spigot wedge ring relative to said socket wedge ring with which it is in effective contact in said annulus such that said spigot gripping protrusions grip said spigot pipe and said socket gripping protrusions grip said socket pipe;

wherein said spigot wedge ring further comprises a frusto-conical surface;

said socket wedge ring further comprises an opposed frusto-conical surface in effective contact with said frusto-conical surface;

the gripping protrusions are biased to prevent axial compression of the pipes;

the frusto-conical surfaces are biased to prevent axial compression of the pipes; and an actuator driving said gripping protrusions into said pipes by imparting axial movement of said wedge rings relative to one another, said axial movement imparting sliding axio-radial movement of said frusto-conical surfaces relative to one another.

6. A concentric pipe joint constraint, said restraint resisting axial movement of a spigot pipe relative to a socket pipe within which a portion of said spigot pipe has been inserted, said spigot pipe and said socket pipe defining an annulus, said restraint comprising:

a spigot wedge ring comprising one or more spigot gripping protrusions;

socket wedge ring comprising one or more socket gripping protrusions;

a wedge housing positioning said spigot wedge ring relative to said socket wedge ring with which it is in effective contact in said annulus such that said spigot gripping protrusions grip said spigot pipe and said socket gripping protrusions grip said socket pipe; and said spigot wedge ring further comprises a frusto-conical surface;

said socket wedge ring further comprises an opposed frusto-conical surface in effective contact with said frusto-conical surface;

wherein the frusto-conical surfaces are biased to prevent axial separation of the pipes; and an actuator driving said gripping protrusions into said pipes by imparting axial movement of said wedge rings relative to one another, said axial movement imparting sliding axio-radial movement of said frusto-conical surfaces relative to one another.

7. A concentric pipe joint constraint, said restraint resisting axial movement of a spigot pipe relative to a socket pipe within which a portion of said spigot pipe has been inserted, said spigot pipe and said socket pipe defining an annulus, said restraint comprising:

a spigot wedge ring comprising one or more spigot gripping protrusions;

socket wedge ring comprising one or more socket gripping protrusions;

a wedge housing positioning said spigot wedge ring relative to said socket wedge ring with which it is in effective contact in said annulus such that said spigot gripping protrusions grip said spigot pipe and said socket gripping protrusions grip said socket pipe;

said spigot wedge ring further comprises a frusto-conical surface;

said socket wedge king further comprises an opposed frusto-conical surface in effective contact with said frusto-conical surface; and wherein the frusto-conical surfaces are biased to prevent axial compression of the pipes.

8. The restraint of claim 7 further comprising an actuator driving said gripping protrusions into said pipes by imparting axial movement of said wedge rings relative to one another, said axial movement imparting sliding axio-radial movement of said frusto-conical surfaces relative to one another.

* * * * *